UNITED STATES PATENT OFFICE 2,381,960

CHEMICAL PROCESSES AND PRODUCTS

Aaron D. Johnson, Brecksville, Ohio, assignor to E. I. du Pont de Nemours & Company, Wilmington, Del., a corporation of Delaware No Drawing. Application November 29, 1940, Serial No. 367,749

13 Claims. (Cl. 210—23)

This invention relates to the treatment of hard water and is particularly directed to water-softening processes in which an alkaline material selected from the group consisting of trisodium phosphate, sodium hydroxide, sodium carbonates, potassium hydroxide, potassium carbonates, soap, and sodium silicate having an $SiO_2:Na_2O$ weight ratio greater than 1.5, is dissolved in hard water, and thereafter, but prior to the formation of a macroscopic precipitate of the hardness, tetrasodium pyrophosphate is dissolved in the water, and is further directed to compositions comprising tetrasodium pyrophosphate and an alkaline material of the stated group, the tetrasodium pyrophosphate being in such form as to have a dissolution rate less rapid than that of the alkaline material.

It is common practice to soften hard water and improve its suitability for detergency processes by causing an alkali to react with and precipitate the cations, such as calcium and magnesium, which are at least in part responsible for the hardness. The composition of the precipitate depends on the alkali used, sodium carbonate, for instance, precipitating insoluble carbonates of calcium and magnesium. Whatever their composition, these precipitates are undesirable in detergency processes and efforts have been made to keep them dispersed and in suspension, at least temporarily, by the action of suitable agents such as tetrasodium pyrophosphate. Tetrasodium pyrophosphate has found considerable use as a water-softening agent and detergent both alone and in combination with other alkaline materials such as trisodium phosphate, soap, and borax.

When another alkaline material is used with tetrasodium pyrophosphate in water-softening processes, the procedure has been to add the pyrophosphate and the other alkaline material to the hard water and effect their dissolution by stirring or sufficiently prolonged standing. In detergency processes employing alkaline materials together with tetrasodium pyrophosphate in hard water, the first step necessarily is to soften the water used and a portion of the pyrophosphate is unavoidably consumed in effecting this softening.

Now according to this invention it is found that when tetrasodium pyrophosphate is used in hard water with certain other alkaline materials, namely, trisodium phosphate, sodium hydroxide, sodium carbonates, potassium hydroxide, potassium carbonates, soap, or sodium silicate having an $SiO_2:Na_2O$ weight ratio greater than 1.5, for water-softening and detergency purposes, generally improved results and a considerable reduction in the amount of the pyrophosphate consumed per unit of water-softening can be accomplished by first dissolving the other alkaline material in the hard water and thereafter, but prior to the formation of a macroscopic precipitate of the hardness, dissolving tetrasodium pyrophosphate in the water. It is found that this result may be accomplished either by adding the pyrophosphate separately shortly after the other alkaline material has gone into solution or by adding the pyrophosphate and the other alkaline material simultaneously but in the form of compositions of such character that the rate of dissolution of the pyrophosphate therein is exceeded by that of the other alkaline material.

The benefits of this invention will ordinarily be secured in the greatest degree when softening waters customarily referred to as "hard," that is, waters containing sixty or more parts per million, of hardness calculated as calcium carbonate, but with waters of lesser hardness advantages may also be obtained, though in lesser degree.

By use of the processes and compositions of this invention one may either effect a considerable reduction of tetrasodium pyrophosphate consumption as compared to previous practices, or for a given consumption of tetrasodium pyrophosphate may effect a substantial increase in the permanency of dispersion of hard water salts. Moreover, by using compositions of this invention, this result can be accomplished without any complications whatsoever of procedures considered to be uniform practice in the detergency and water-softening fields.

It is observed that the foregoing beneficial effects are obtained only when tetrasodium pyrophosphate is used in hard water in conjunction with certain alkaline materials. These alkaline materials will hereinafter be referred to as "supplemental alkaline materials," and it is to be understood that the supplemental alkaline material may be selected from the group consisting of trisodium phosphate, sodium hydroxide, sodium carbonates such as the normal and sesquicarbonates, potassium hydroxide, potassium carbonates, soap, and sodium silicate having an $SiO_2:Na_2O$ weight ratio greater than 1.5.

The amount of a supplemental alkaline material dissolved in hard water prior to dissolving tetrasodium pyrophosphate therein preferably should be at least sufficient to react with all the hardness, although advantages according to this invention may be realized even when only a fraction of this amount of alkaline material is dissolved before dissolution of the pyrophosphate is started.

The dissolution in hard water of a supplemental alkaline material prior to tetrasodium pyrophosphate may be accomplished in a process of this invention by adding these two agents separately, an amount of the supplemental alkaline material, preferably at least sufficient to react with all the hardness of the water, being dissolved prior to the addition of the pyrophosphate. When the invention is practiced in this manner it is important that the pyrophosphate be added before the formation of a macroscopic precipitate of the hardness in the water has been effected by the supplemental alkaline material. By a macroscopic precipitate is meant a precipitate, the individual particles of which are distinguishable by the eye and which are of such a size as will rapidly settle. A cloudy suspension of particles of colloidal dimensions would not be considered as a macroscopic precipitate. Ordinarily, it is desirable to add the pyrophosphate within a moment or two after enough supplemental alkaline material has dissolved to react with the hardness, although a longer lapse of time may occur provided the hardness does not form a macroscopic precipitate.

From the standpoint of simplicity of operation it is preferred to add the supplemental alkaline material and the tetrasodium pyrophosphate to hard water simultaneously, since the separate addition of calculated amounts of these agents would be bothersome to the user. By simply mixing the pyrophosphate and alkaline material according to prior art practices and adding this mixture to hard water the desirable results of this invention cannot be realized, however. Thus, when a product containing, say, nine parts by weight of trisodium phosphate and one part of tetrasodium pyrophosphate is added to hard water, both the orthophosphate and pyrophosphate dissolve simultaneously. A composition of this invention, on the other hand, may employ a supplemental alkaline material and sodium pyrophosphate in such physical form that when the two are added to water as a mixture, the rate of dissolution of the supplemental alkaline material exceeds that of the pyrophosphate. To retard the dissolution rate of the pyrophosphate in such a mixture one may, for instance, coat the pyrophosphate particles with a slowly soluble material such as soap, sodium metasilicate, gums, resins, or a similar material which will not interfere with detergency or water-softening processes. Alternatively, one may employ a mixture of trisodium phosphate and particles of tetrasodium pyrophosphate of such size relative to the trisodium phosphate that dissolution of the pyrophosphate is less rapid on account of its larger particle size.

The processes and products of this invention may be better understood by reference to the following specific examples which are given by way of illustration and not of limitation.

In Example I is shown an improvement in water-softening resulting from first dissolving in hard water a supplemental alkaline material and then separately, but shortly thereafter, dissolving tetrasodium pyrophosphate in the water.

Example I

To effect softening of a water containing 200 P. P. M. of hardness there was added a total of .075% by weight of trisodium phosphate and tetrasodium pyrophosphate in the proportion of nine parts of trisodium phosphate dodecahydrate to one part of anhydrous tetrasodium pyrophosphate, the pyrophosphate being added separately one minute after the trisodium phosphate had completely dissolved. Dissolution of the trisodium phosphate required about 0.1 minute. A dispersion of the phosphate salt of the cations responsible for the hardness of the water was obtained which was stable for thirty minutes at 60° C.

To effect the same degree of dispersion in water of the same hardness under the same conditions using the same proportions of trisodium phosphate and tetrasodium pyrophosphate but adding the two phosphates so that they dissolved simultaneously there was required a total of .095% by weight of the mixture. It will thus be seen that a substantial saving in the amount of phosphate required to effect the desired dispersion had been accomplished.

By experiments similar to those of Example I made with water of 300 P. P. M. hardness, it was shown that from 30 to 40 per cent of a 90–10 mechanical mixture of trisodium phosphate and tetrasodium pyrophosphate is required for good dispersion than is required when the same proportion of ingredients is separately added. It was further found by direct comparison that nine parts of trisodium phosphate and one part of tetrasodium pyrophosphate separately added disperses hard water salts as efficiently as an equal amount of a mechanical mixture containing 7.5 parts trisodium phosphate and 2.5 parts tetrasodium pyrophosphate. Thus, it is seen that a considerable saving of tetrasodium pyrophosphate is effected by dissolving the two components separately, the trisodium phosphate first.

The effect of using tetrasodium pyrophosphate of controlled size relative to the size of the supplemental alkaline material in a composition of this invention is shown in Example II.

Example II

Mechanical mixtures containing nine parts of crystalline trisodium phosphate dodecahydrate and one part of anhydrous tetrasodium pyrophosphate were made up by mechanically mixing the separate components. The crystal size of the trisodium phosphate in these mixtures was the same in each case, but the size of tetrasodium pyrophosphate particles was controlled. The mixtures were then used for softening water containing 300 ppm. hardness with the following results:

| Size of tetrasodium pyrophosphate particles | Percent mixture required to suspend hardness for 30 minutes at 60° C. |
| --- | --- |
| Larger than 48 mesh | 0.13 |
| 50–100 mesh | 0.135 |
| 100–150 mesh | 0.145 |
| 150–200 mesh | 0.15 |
| 200–300 mesh | 0.15 |
| Thru 300 mesh | 0.175 |

It is seen from these results that in the mechanical mixture the use of coarse pyrophosphate reduced the amount of the water-softening mixture required to give the desired results.

It will be apparent that by controlling the size of both tetrasodium pyrophosphate and of the supplemental alkaline material used with it there can be produced mixtures having standardized water-softening and detergent properties and that once the amount of such a mixture required for softening of a particular water is determined further experimentation will not be required. By suitably coating the tetrasodium pyrophosphate particles, standardized mixtures may similarly be produced.

The results described above with respect to water softening are found to be substantially duplicated with respect to detergency processes employing hard water. Thus, the compositions of this invention are found not only to have maximum dispersing, suspending and deflocculating action on hard water and heavy metal salts, but also when suspending in hard water such soils, greases, and other dirts as are ordinarily encountered in washing of dishes, clothes, porcelain, milk bottles, wool, cotton, wood work, and similar objects subjected to detergent action.

The amount of tetrasodium pyrophosphate used in combination with a supplemental alkaline material may be considerably varied. For most applications the supplemental alkaline material comprises the major component and the tetrasodium pyrophosphate a minor component of a composition of this invention, but for special cases these proportions may be reversed.

While in the foregoing description of this invention there have been shown certain specific processes and compositions, it will be understood that without departing from the scope of this invention those skilled in the art may employ numerous processes and related compositions.

I claim:

1. In a process for softening hard water the steps comprising dissolving in the water an alkaline material selected from the group consisting of trisodium phosphate, sodium hydroxide, sodium carbonates, potassium hydroxide, potassium carbonates, soap, and solid sodium silicate having an $SiO_2:Na_2O$ weight ratio greater than 1.5, and thereafter, but prior to formation of a macroscopic precipitate of the hardness, dissolving tetrasodium pyrophosphate in the water.

2. In a process for softening hard water the steps comprising dissolving in the water trisodium phosphate, and thereafter, but prior to formation of a macroscopic precipitate of the hardness, dissolving tetrasodium pyrophosphate in the water.

3. In a process for softening hard water the steps comprising dissolving in the water normal sodium carbonate, and thereafter, but prior to formation of a macroscopic precipitate of the hardness, dissolving tetrasodium pyrophosphate in the water.

4. In a process for softening hard water the steps comprising dissolving in the water soap, and thereafter, but prior to formation of a macroscopic precipitate of the hardness, dissolving tetrasodium pyrophosphate in the water.

5. In a process for softening hard water the steps comprising dissolving in the water an alkaline material selected from the group consisting of trisodium phosphate, sodium hydroxide, sodium carbonates, potassium hydroxide, potassium carbonates, soap, and solid sodium silicate having an $SiO_2:Na_2O$ weight ratio greater than 1.5, in an amount at least sufficient to react with all of the hardness, and thereafter but prior to formation of a macroscopic precipitate of the hardness, dissolving tetrasodium pyrophosphate in the water.

6. A water-softening composition comprising tetrasodium pyrophosphate and an alkaline material selected from the group consisting of trisodium phosphate, sodium hydroxide, sodium carbonates, potassium hydroxide, potassium carbonates, soap, and solid sodium silicate having an $SiO_2:Na_2O$ weight ratio greater than about 1.5 the tetrasodium pyrophosphate having a slower rate of solution than the alkaline material in water.

7. A water-softening composition comprising tetrasodium pyrophosphate and trisodium phosphate, the tetrasodium pyrophosphate having a slower rate of solution than the trisodium phosphate in water.

8. A water-softening composition comprising tetrasodium pyrophosphate and soap, the tetrasodium pyrophosphate having a slower rate of solution than the soap in water.

9. A water-softening composition comprising tetrasodium pyrophosphate and normal sodium carbonate, the tetrasodium pyrophosphate having a slower rate of solution than the sodium carbonate in water.

10. A water-softening composition comprising tetrasodium pyrophosphate and an alkaline material selected from the group consisting of trisodium phosphate, sodium hydroxide, sodium carbonates, potassium hydroxide, potassium carbonates, soap, and solid sodium silicate having an $SiO_2:Na_2O$ weight ratio greater than about 1.5 the tetrasodium pyrophosphate being coated with a material which dissolves in water more slowly than the alkaline material.

11. A water-softening composition comprising tetrasodium pyrophosphate and trisodium phosphate, the tetrasodium pyrophosphate being coated with a material which dissolves in water more slowly than the trisodium phosphate.

12. A water-softening composition comprising discreet particles of tetrasodium pyrophosphate and of an alkaline material selected from the group consisting of trisodium phosphate, sodium hydroxide, sodium carbonates, potassium hydroxide, potassium carbonates, soap, and solid sodium silicate having an $SiO_2:Na_2O$ weight ratio greater than about 1.5, the average particle size of the tetrasodium pyrophosphate being larger than that of the other alkaline material.

13. A water-softening composition comprising discreet particles of tetrasodium pyrophosphate and of trisodium phosphate, the average particle size of the tetrasodium pyrophosphate being larger than that of the trisodium phosphate.

AARON D. JOHNSON.